United States Patent
Johnston et al.

(10) Patent No.: US 10,127,144 B2
(45) Date of Patent: Nov. 13, 2018

(54) AUTOMATED TESTING OF CODE MODULES AGAINST INDIVIDUALLY RELEVANT DATA SETS

(71) Applicant: Cisco Technology, Inc., San Jose, CA (US)

(72) Inventors: Jay K. Johnston, Raleigh, NC (US); Magnus Mortensen, Cary, NC (US); David C. White, Jr., Saint Petersburg, FL (US)

(73) Assignee: Cisco Technology, Inc., San Jose, CA (US)

(*) Notice: Subject to any disclaimer, the term of this patent is extended or adjusted under 35 U.S.C. 154(b) by 15 days.

(21) Appl. No.: 15/332,080

(22) Filed: Oct. 24, 2016

(65) Prior Publication Data

US 2018/0113798 A1 Apr. 26, 2018

(51) Int. Cl.
*G06F 11/36* (2006.01)

(52) U.S. Cl.
CPC .......... *G06F 11/3684* (2013.01); *G06F 11/36* (2013.01); *G06F 11/3604* (2013.01); *G06F 11/3612* (2013.01); *G06F 11/3664* (2013.01); *G06F 11/3668* (2013.01); *G06F 11/3688* (2013.01)

(58) Field of Classification Search
None
See application file for complete search history.

(56) References Cited

U.S. PATENT DOCUMENTS

| | | | |
|---|---|---|---|
| 7,313,552 B2 | 12/2007 | Lorenz et al. | |
| 7,555,735 B2 | 6/2009 | Papadopoulou et al. | |
| 7,747,736 B2 | 6/2010 | Childress et al. | |
| 7,996,352 B2 | 8/2011 | Jung et al. | |
| 8,380,651 B2 | 2/2013 | Gould et al. | |
| 9,229,845 B1* | 1/2016 | Chandrasekharapuram | G06F 11/3692 |
| 2008/0086660 A1* | 4/2008 | Wefers | G06F 11/3688 714/37 |

* cited by examiner

*Primary Examiner* — Wynuel S Aquino
*Assistant Examiner* — Mark A Gooray
(74) *Attorney, Agent, or Firm* — Edell, Shapiro & Finnan, LLC

(57) ABSTRACT

A testing server tests new code modules, or re-tests previously tested code modules, using individualized sets of test data. The testing server receives test datasets from an execution engine, which runs tested code modules to process operational datasets of computing devices. The testing server receives an untested code module from a user, and obtains test dataset parameters applicable to the untested code module. The testing server generates an individualized set of test datasets based on the test dataset parameters. The testing server tests the untested code module by processing each test dataset in the individualized set of test datasets to produce test results.

17 Claims, 8 Drawing Sheets

US 10,127,144 B2

AUTOMATED TESTING OF CODE MODULES AGAINST INDIVIDUALLY RELEVANT DATA SETS

TECHNICAL FIELD

The present disclosure relates to software code testing.

BACKGROUND

The use of automated problem detection and remediation systems enable the services support industry to transition from reactive support to proactive and preemptive support. The automated problem detection and remediation system may leverage machine consumable intellectual capital (IC) rules (e.g., software code modules) that detect and solve problems in customer devices. In some examples, problem detection engines may leverage IC rules to detect problems in customer device support data, and may run thousands of times per day. The engines may process data from many different types of devices, with each device configured differently per the customer's network.

Creating machine consumable IC rules to detect specific issues presents challenges due to the multitude of potential combinations of devices and configurations that may not be envisioned when creating the IC rules. Even if the logic of the IC rule seems correct, the IC rule may fail to work properly on data generated by a device that is configured slightly differently than the IC author expected. The unexpected configuration may cause the execution engine processing the IC modules against the input data to crash, or produce a false positive or false negative result.

Continuous integration allows for a number of static tests with a static input dataset whenever a new code change is performed. Unit testing is a software testing technique where individual functions are run against input data sets and their outputs are checked for correctness. However, the input data for both continuous integration and unit testing is typically static and may not reflect the configuration of devices as they are implemented in the real world.

DESCRIPTION OF EXAMPLE EMBODIMENTS

Overview

Figure 1:
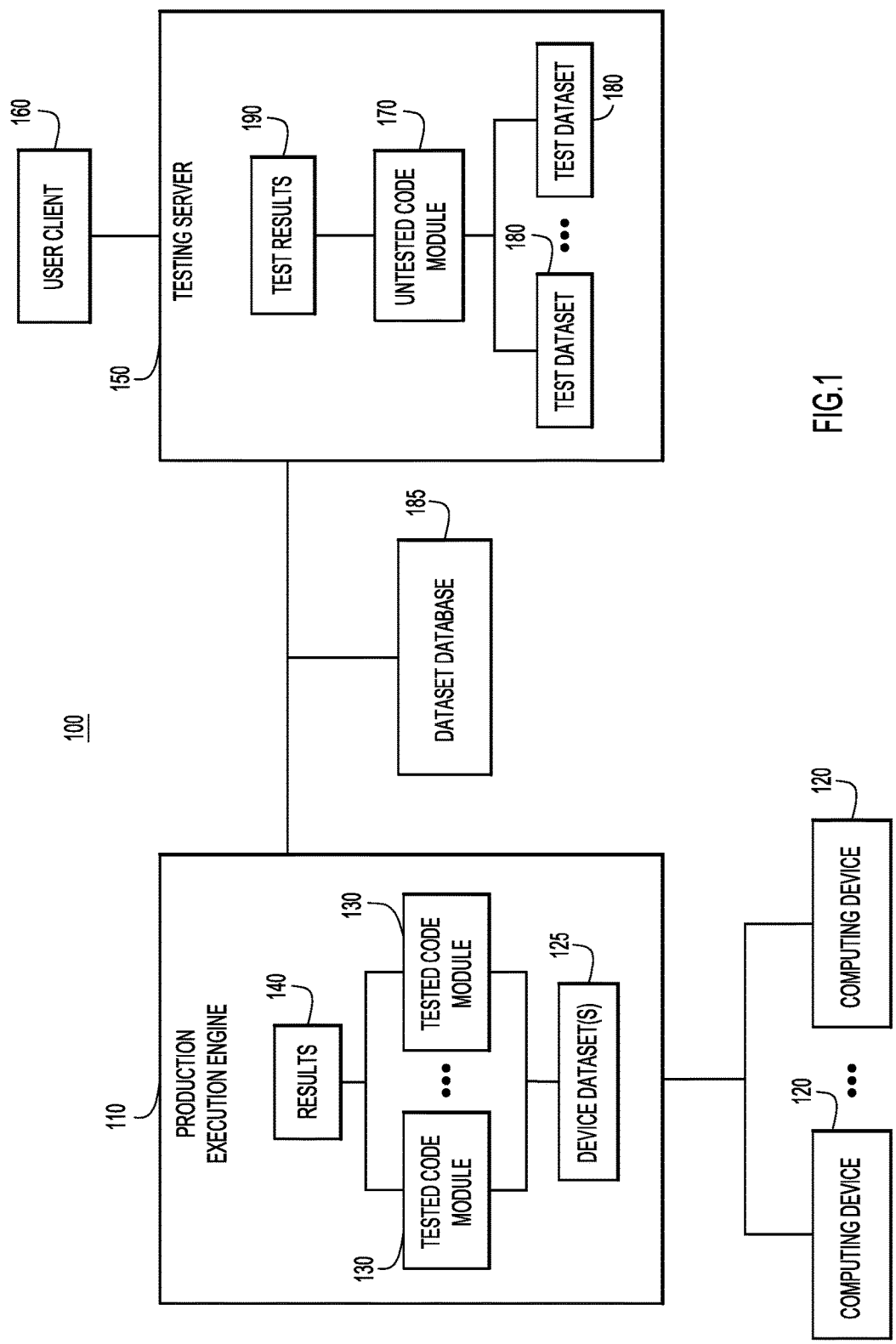
FIG. 1 is a simplified block diagram of a support service that uses code modules and tests new code modules, according to an example embodiment.

A computer-implemented method is provided to test code modules using individualized sets of test data. A testing server receives a plurality of test datasets from an execution engine. The execution engine runs a plurality of tested code modules to process operational datasets of at least one computing device. The testing server receives an untested code module from a user client, and obtains test dataset parameters applicable to the untested code module. The testing server generates a first set of test datasets from the plurality of test datasets based on the test dataset parameters. The testing server tests the untested code module by processing each test dataset in the first set of test datasets to produce test results.

DETAILED DESCRIPTION

Presented herein are techniques to allow users to create intellectual capital (IC) problem detection rules though software code modules for an automated detection engine, and test those rules against a large number of real-world input datasets. The input datasets may be constantly changing and updated based on the actual usage of the engine. The system helps authors create code modules for IC rules that more accurately detect problems in customer devices and minimize errors that may arise from the unexpected configurations of the customer devices. An author of an IC rule can test their code module against hundreds of real world input datasets at once, and observe how their code module behaves on each of them. Any IC problems are exposed to the author so they can fix them right away, instead of having to put their code module in production and wait for input data to come in and have their IC rule fail before improving the code module. The set of test datasets is an intelligent beta set that is constantly changing. As the production engine processes new production data sets, it adds them to the data set library.

In one example, the techniques presented herein may be implemented in an automated problem detection and alerting system. At the heart of the system is an execution engine that receives data from a plurality of devices (e.g., configuration information/diagnostic/operating state data from a router, a support file of the current operating state from a computing device, logs from a network device such as a network switch or router, etc.), and processes the data as input for code modules that test and inspect the data for problems in the devices. The operational data may be gathered at each device by a user or administrator and sent (e.g., emailed, uploaded to a website, etc.) to the system for processing by the code modules. In another example, the operational data is automatically collected on the device and periodically sent to the system for processing. The operational data may be grouped into a single file or may be processed as a group (e.g., a zipped file of multiple types of operational data).

The code modules may be in the form of software program scripts, such as Python™ scripts. The scripts are typically run in parallel on the engine, with each script looking for a different problem in the input data set. In one example, the scripts are coded to look for issues with software configuration or hardware settings in the device that generated the input data set. The scripts output any issues found in the data set back to the engine, which presents the issues to a user (e.g., via a web interface, email, etc.) or a machine/software system (e.g., via an API, or other machine to machine interface). Any of the scripts may return a null set of results, indicating that the issue targeted by the script was not a problem in this particular input data set.

The techniques presented herein provide for a method of capturing and re-leveraging an ever-changing, constantly mutating set of real-world data, and then applying that data as input to test and validate code modules. In one example, the testing system monitors the production input datasets (e.g., device datasets) which have caused problems in a significant portion (e.g., 20-30%) of the existing IC rule code modules. When a given input dataset has caused significant problems with the production IC rule code modules, this input data is flagged and added to a circular buffer of worst-case datasets. This circular buffer of worst-case datasets becomes one input source for the testing system's test datasets. Thus, the most recent worst-case datasets may be targeted to run against a new IC rule code module in order to expose upper-bounds (or other boundary) problems in the logic of the new IC rule code module.

For instance, if the diagnostic data from a particular model of a network router has a very large output, which causes a significant fraction (e.g., 5-25%) of the IC rule code modules to fail in the production system, then that dataset is saved and used again later on new IC rule code modules, since it has shown itself to expose bugs in a significant portion of the current IC rule code modules. The collection of datasets may be continuous in the production system, and the monitoring of input data and how that affects code modules may also be continuous. As a result, worst-case datasets may be added to the circular buffer continuously. For instance, the testing system may store the last 30 of the worst-case datasets. This allows the circular buffer to be constantly refreshed with the latest worst-case test datasets.

In another example, the testing system may categorize the test datasets based on the types of problems that were detected by other IC rules used in the production system, and save that metadata in a test library (e.g., as a tag on the test dataset). Using these categorized datasets, the testing system can intelligently target specific test datasets for particular IC rule code modules based on the device feature or category that IC rule is investigating. For instance, an engineer might write code to detect problems with Open Shortest Path First (OSPF) routes in a network. However, if the latest 100 or 1000 datasets did not have OSPF configured, the IC rule might not be triggered, and any bugs might not be exposed. With the capability to target specific test datasets, the OSPF IC rule code module may be specifically run against test datasets that detected other IC rules which generated alerts about OSPF configurations. This increases confidence that the test dataset may have a configuration that the IC rule is testing, and potentially expose more bugs in that IC rule code module.

In a further example, the testing system automatically and continuously stores fresh test datasets. The testing system leverages the production engine to process customer data and as it does, it adds to a library of test datasets, which guarantees the test datasets are fresh. Using the combination of the worst-case test datasets and the technology-specific test datasets, the testing system is able to test new code modules with test datasets that are 1) very fresh (i.e., the latest datasets), 2) specific and targeted (i.e., relevant to the technology tested by the code module) to ensure the IC rule actually gets executed, and 3) has been shown to cause problems to a significant number of other IC rule code modules (i.e., IC rules that are running in the production system).

Referring now to FIG. 1, a simplified block diagram of a testing system 100 is shown for testing new code modules in a support service implementation. The support service comprises a production execution engine 110 that receives input data from a plurality of computing devices 120. The production execution engine 110 receives device dataset(s) 125 from the plurality of computing devices 120. In one example, the device datasets 125 may include configuration/diagnostic information retrieved from the computing devices 120. The device datasets 125 serve as input data for a plurality of verified and validated tested code modules 130. The tested code modules 130 implement IC rules that have been previously tested and determined to function appropriately. The production execution engine 110 runs the tested code modules 130 with the device datasets 125 to produce results 140. In one example, the results 140 indicate any issues that the tested code modules 130 have found in the computing devices 120 which correspond to the device datasets 125.

A testing server 150 is communicatively connected to the production execution engine 110 and allows authors of untested code modules 170 to test their code module 170 against real world datasets. The production execution engine 110 sends some or all of the device datasets 125 to the testing server 150. The testing server saves the device datasets 125 as test datasets 180. This allows the authors to debug the untested code module 170 and confirm that it functions properly for a multitude of devices (each configured differently) with numerous different input datasets. In another example, the production execution engine 110 and the testing server 150 may both be communicatively coupled to a database 185 for saving device datasets 125. The testing server may access the dataset database 185 to retrieve test datasets 180.

The testing server 150 may also receive and save indications of the performance of the production execution engine 110 when various tested code modules 130 are run with each test data set 180. In other words, the production execution engine 110 may provide the testing server 150 with performance data, such as the number of output reports generated from a given test dataset 180, or the average length of time required to process the given test dataset 180.

The testing server 150 runs an untested code module 170 with a plurality of test datasets 180 to produce test results 190. The test results 190 may include performance data for the untested code module 170. The performance data may include, for example, runtime (i.e., the amount of time the testing server 150 took to process the untested code module 170 with a particular test dataset 180), code module results (i.e., any problems that the IC rule of the untested code module 170 detected in a particular test dataset 180), debugs (i.e., the amount and contents of any processing debugs generated by the untested code module 170 with a particular test dataset 180), execution failures (i.e., any crashes or problems the untested code module 170 encounters with a particular test dataset 180), or any other useful information about how the untested code module 170 performs when run with the test datasets 180.

In one example, the testing system 100 provides an automated system of testing machine consumable IC rules (e.g., code modules) by running them over a large number of recently used, real-world datasets that are automatically saved from previous production use. In particular, the testing system 100 can test new IC rules against particular input datasets that have been shown to cause problems for a significant number of other IC rules. Additionally, the testing system 100 can test new IC rules against input datasets that have features activated that pertain to the new IC rule's technology category. This may be done by observing how other IC rules within the same technology category are triggered on input from those input datasets. Further, the testing system 100 may be used to automatically approve or deny IC rules into the production system based on whether significant issues are found in testing the IC rule.

Figure 2:
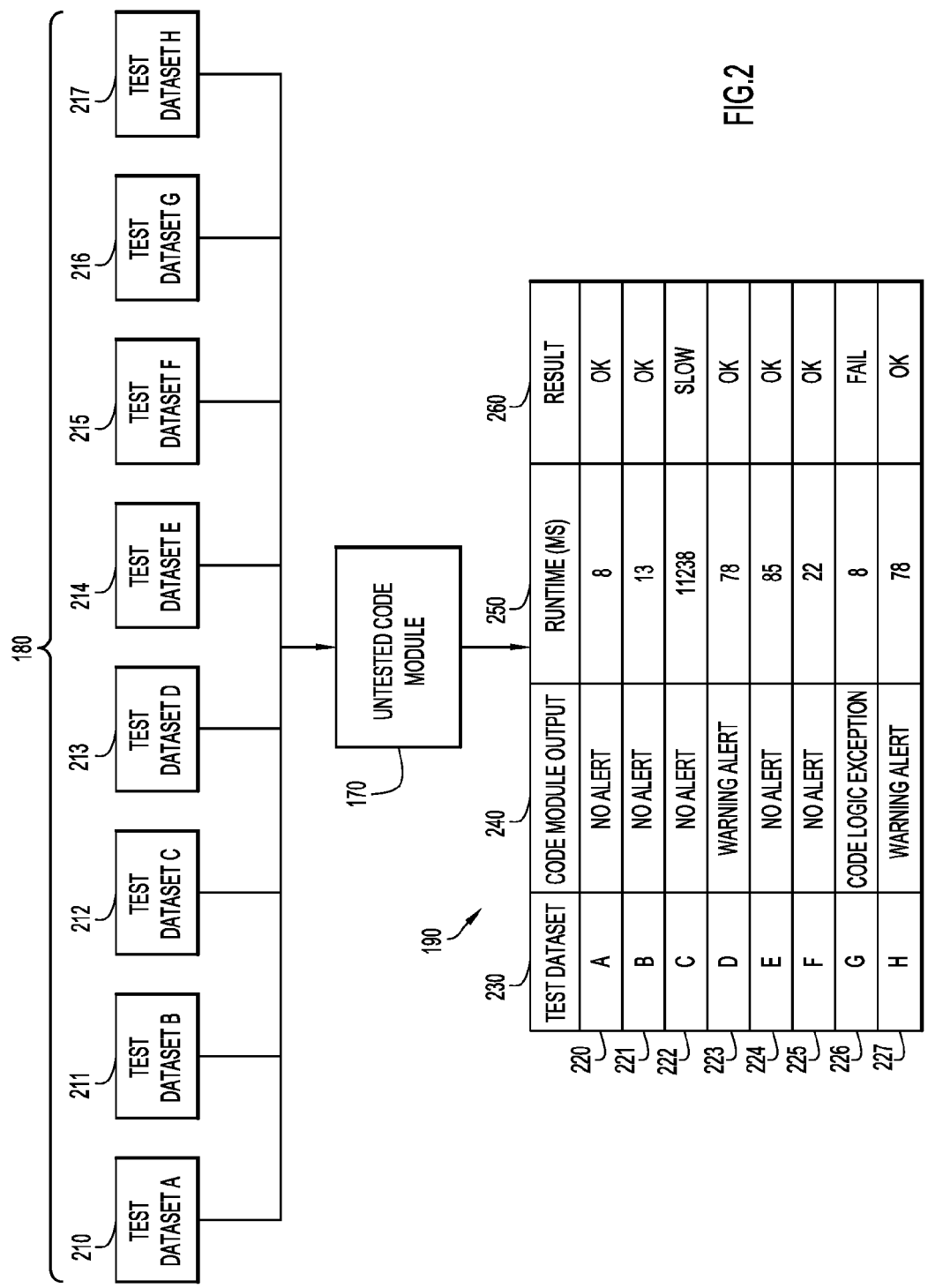
FIG. 2 is a diagram illustrating testing of a new code module with a plurality of test datasets, according to an example embodiment.

Referring now to FIG. 2, a block diagram shows an example of running an untested code module 170 with a set of test datasets. The untested code module 170 is run on the testing server (e.g., testing server 150 shown in FIG. 1) with each test dataset in a selected test dataset 180 that includes test datasets 210-217, which are also referred to herein as test datasets A-H, respectively. In one example, the test datasets 210-217 may be a subset of the test datasets 180 that have been saved from the production execution engine 110, and the test datasets 210-217 may be individually selected for the specific untested code module 170. In another example, the test datasets 210-217 may be the most recent device datasets that have been received and processed by the production execution engine 110.

The test results 190 produced by executing the untested code module 170 with each of the test datasets 210-217 in the selected test dataset 180 includes test results for each test dataset 210-217. Each row 220-227 in the test results 190 corresponds to the results for a specific input test dataset. The test results 190 includes a column 230 that identifies the test dataset, a column 240 that identifies the code module output, a column 250 that identifies the runtime, and a column 260 that identifies the overall result of the test. While the test results 190 are shown in a tabular form, any other format for storing and/or presenting the results of running the untested code module with the plurality of test datasets 210-217 may also be used.

In the depicted test results 190, testing code module 170 with test datasets A, B, D, E, F, and H all result in an overall test result 260 of OK. These results indicate that the code module 170 performed as expected when operating on test datasets A, B, D, E, F, and H. Additionally, the code module 170 found a warning event in the test datasets D and H. The presence of a warning event in the code module output 240 is an indication that the IC rule encoded in the code module 170 has found a condition in the computing device 120 associated with the particular test dataset.

The test result row 222 for executing code module 170 with an input of test dataset C indicates that the code module output 240 did not generate any alert, but the code module 170 required an execution runtime of 11,238 milliseconds. Since the runtime 250 exceeds a predetermined threshold, which may vary depending on the complexity of the code module and the test dataset, the overall test result 260 shows a SLOW result.

The test result row 226 for executing code module 170 with an input of test dataset G indicates that the code module 170 generated a code logic exception, e.g., the code module failed to execute or crashed the test server. Since the code module 170 could not handle the test dataset G, the overall test result 260 shows a FAIL result.

Due to coding and logic errors that may occur in untested code modules, especially when the authors are not professional programmers, it may be useful to try and expose these errors during the creation and testing process of the code modules. Particularly large and/or complicated test datasets, which cause problems for a significant number of code modules, may be designated to test against any untested code modules 170 to expose issues in the code.

In one example, with reference to FIG. 1, as the production execution engine 110 processes device datasets 125, occasionally it will encounter a very large device dataset that causes a significant percentage (e.g., greater than 5-25%) of the tested code modules 130 to crash and fail. The production execution engine 110 may designate this particular device dataset as a test dataset 180 for later use in testing an untested code module 170 using testing server 150. By testing new code modules against real-world extreme inputs, the testing server 150 assists the code authors in proactively fixing any code issues, and helps to ensure that their code modules function properly when placed into production.

Figure 3:
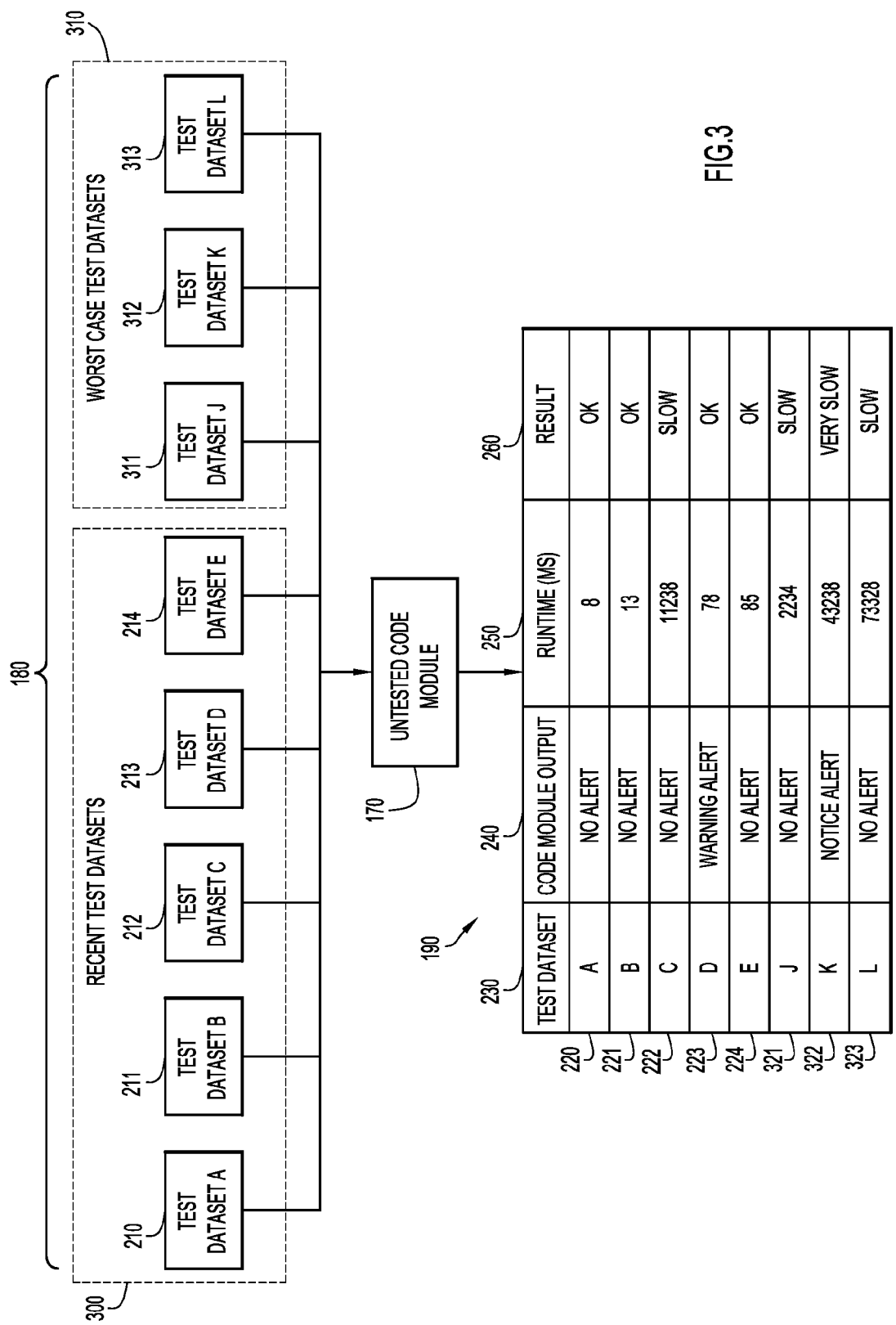
FIG. 3 is a diagram illustrating testing of a new code module with a plurality of recently saved input datasets and a plurality of worst-case test datasets, according to an example embodiment.

Referring now to FIG. 3, a block diagram shows an example of testing an untested code module 170 with worst-case test datasets. The set of test datasets 180 selected for the untested code module 170 includes a set of recent test datasets 300 and a set of worst-case test datasets 310. The set of recent test datasets 300 include test datasets 210-214, as described with respect to FIG. 2. The set of worst-case test datasets 310 includes test datasets 311, 312, and 313, also described herein as test datasets J, K, and L, respectively. The test results 190 includes rows 220-224 corresponding to test datasets A-E, respectively, as described with respect to FIG. 2. Additionally, the test results 190 include rows 321, 322, and 323 corresponding to test datasets J, K, and L, respectively.

In one example, the test dataset J is designated as a worst-case test dataset because it is a particularly complicated dataset that has generated code faults in previously tested code modules. The test result row 321 for executing code module 170 with an input of test dataset J indicates that the code module output 240 does not generate any alert, but the code module 170 required an execution runtime of 2,234 milliseconds. Since the runtime 250 exceeds a predetermined threshold, the overall test result 260 shows a SLOW result.

In another example, the test dataset K is designated as a worst-case test dataset because it is a particularly large dataset that includes a large amount of data for any code module to process. The test result row 322 for executing code module 170 with an input of test dataset K indicates that the code module output 240 generates a notice alert. Additionally, the code module 170 required an execution runtime of 43,238 milliseconds, which greatly exceeds a predetermined threshold, and causes the overall test result 260 to show a VERY SLOW result. For instance, the overall test result 260 of VERY SLOW may be generated when the runtime exceeds the predetermined threshold by a certain percentage (e.g., 200%).

In a further example, the test dataset L is designated as a worst-case test dataset because it is both large and complicated, e.g., the test datasets L includes a large amount of data for any code module to process and has generated code faults in previously tested code modules. The test result row 323 for executing code module 170 with an input of test dataset L indicates that the code module output 240 does not generate any alert. However, the code module 170 required an execution runtime of 73,328 milliseconds, which exceeds a predetermined threshold, and generates an overall test result 260 of SLOW.

Each dataset may be compared to a different predetermined threshold when determining whether the code module 170 runs slowly. For instance, even though the runtime 250 of row 323 (corresponding to test dataset L) exceeds the runtime 250 of row 322 (corresponding to test dataset K), the overall test results 260 are SLOW and VERY SLOW, respectively. In one example, the predetermined threshold may be based on the average runtime for the respective test dataset when it was processed by the production execution engine. In other words, a test dataset that required an average of 2,500 milliseconds to process the tested code modules 130 in the production execution engine 110 may have a runtime threshold of 5,000 milliseconds when the testing server 150 runs that test dataset on an untested code module 170.

In another example, the set of worst-case test datasets 310 may be selected for a specific untested code module 170 from all of the available test datasets based on stored metrics of performance for all of the test datasets. When each device dataset is processed in the production execution engine 110, metrics describing the behavior (e.g., runtime, crashes, etc.) may be stored in association with the device datasets for subsequent use as test datasets. In this example, when an untested code module 170 is designated to be tested against worst-case test datasets, the testing server 150 determines an appropriate set of worst-case test datasets 310 based on the metrics associated with each test dataset.

Many IC rules are created to detect a specific condition that applies to specific device features or failure scenarios. For this reason, code modules for these IC rules may be tested specifically against test datasets that are related to the feature for which the IC rule is written. Code modules that look for similar issues in the operational data (e.g., security flaws) may be grouped and tagged with indicators of the corresponding issue. Additionally, code modules that operate on data sets from similar devices (e.g., routers, network switches, etc.) may be grouped and tagged with indicators of the corresponding device. Further, code modules that operate on a specific technology (e.g., Virtual Private Networking (VPN), Network Address Translation (NAT), Session Initiation Protocol (SIP), etc.) may be grouped and tagged with indicators of the specific technology. In general, the tags may be associated with any conceptual grouping of IC rules based on purpose or technology.

For instance, if a code module is created for an IC rule that detects a specific problem that is only found on routers with VPN tunnels configured, then the code module should be tested with device datasets gathered from routers that have VPN tunnels configured. Since many routers are not configured with VPN tunnels, many of the device datasets will never trigger a meaningful output from the code module that targets the specific problem in VPN tunnels.

Figure 4:
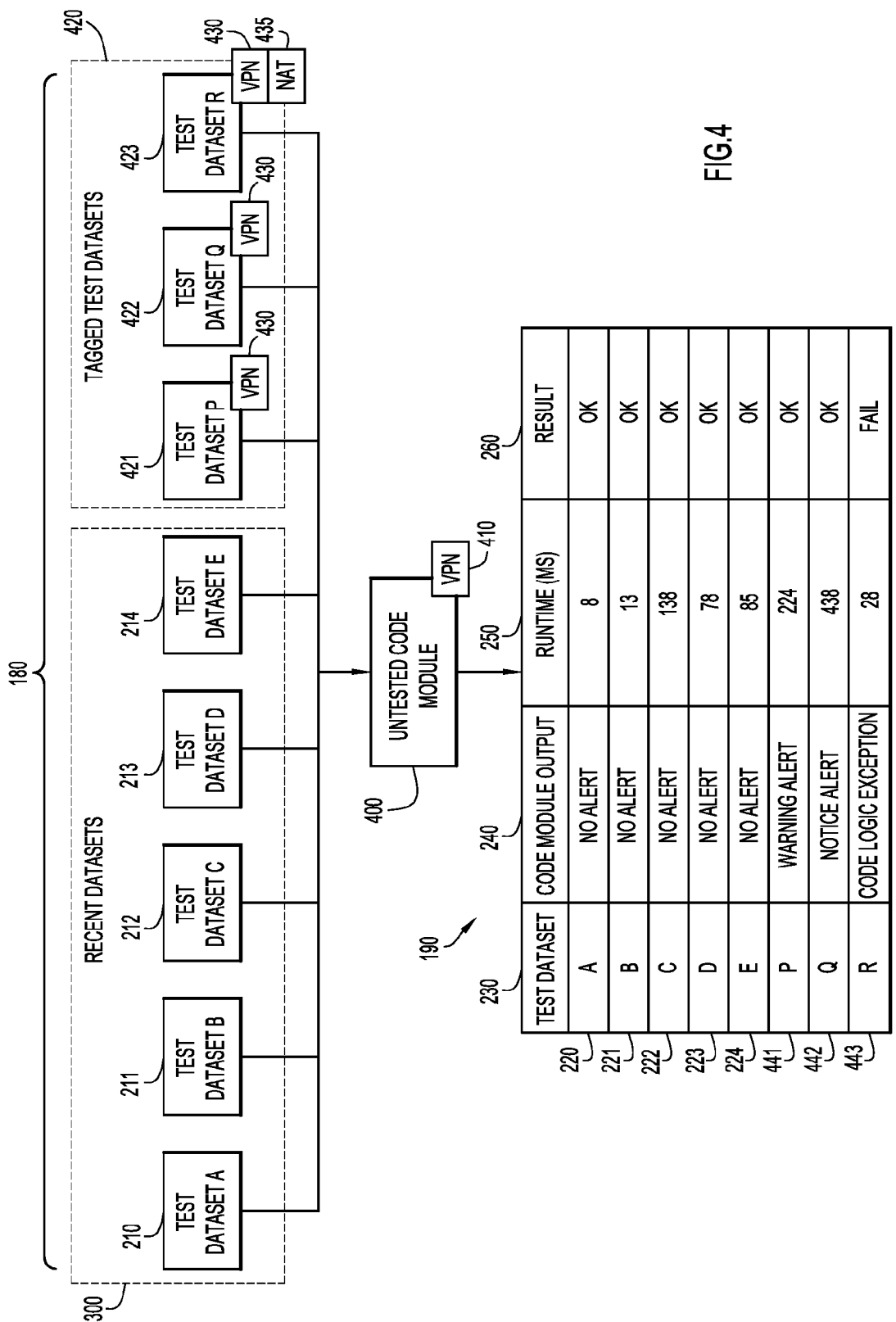
FIG. 4 is a diagram illustrating testing of a new code module with a plurality of recently saved input datasets and a plurality of tagged test datasets, according to an example embodiment.

Referring now to FIG. 4, a block diagram shows an example of testing an untested code module 400 with test datasets that are tagged. The untested code module 400 includes a tag 410 that identifies the code module 400 as related to VPN technology. The set of test datasets 180 selected for the untested code module 400 includes a set of recent test datasets 300 and a set of tagged test datasets 420. The set of recent test datasets 300 include test datasets 210-214, as described with respect to FIG. 2. The set of tagged test datasets 420 includes test datasets 421, 422, and 423, also described herein as test datasets P, Q, and R, respectively. Each of the test datasets 421, 422, and 423 includes a tag 430 that identifies the test dataset as being related to VPN technology. Additionally, the test dataset 423 also includes a tag 435 that indicates the dataset is related to NAT technology. In one example, the set of tagged test datasets 420 selected for the untested code module 400 with a VPN tag 410 includes test datasets with the VPN tag 430, but may also include other tags, such as the NAT tag 435.

The test results 190 includes rows 220-224 corresponding to test datasets A-E, respectively, as described with respect to FIG. 2. Unlike the examples shown in FIG. 2 and FIG. 3, row 222 does not have a large runtime 250, and generates an overall test result 260 of OK. In the example shown in FIG. 4, the untested code module 400 may not call the portion of code (e.g., a procedural loop) that is responsible for the excessive runtime in the examples shown in FIG. 2 and FIG. 3, and is able to complete processing the test dataset C in a more reasonable runtime of 138 milliseconds.

Additionally, the test results 190 include rows 441, 442, and 443 corresponding to test datasets P, Q, and R, respectively. Test result row 441 corresponding to test dataset P generates a warning alert in the code module output 240, and an overall test result 260 of OK. Test result row 442 corresponding to test dataset Q generates a notice alert, and an overall test result 260 of OK. Test result row 443 corresponding to test dataset R generates a code logic exception, which generates an overall test result 260 of FAIL.

In one example, the tags in the tagged test datasets are determined by tags associated with tested code modules for IC rules that triggered on the corresponding device dataset. Each code module is classified and tagged with technology tags, e.g., by the author of the code module. By applying the tags, the code module is placed into one or more categories (e.g., Routing, Security, VPN, NAT, SIP, etc.).

As the production execution engine processes device datasets, any results (e.g., code module output other than OK) generated by the tested code modules are saved in a database, along with the category tag. The results in the database are indexed by the device dataset that triggered the result. When a new code module is tested, its category tag is examined and the database is referenced to find specific input data sets that had results generated by the tested code modules which share the same category tag as the new code module. The testing server leverages these specific test datasets, which had results generated from tested code modules matching the category of the new code module, to test the new code module. As a result, the new code module is tested using input datasets that are relevant to the specific technology it is examining, increasing the exposure of the new code module to potential bugs, false positives, and false negatives.

In another example, device datasets that trigger an output from a tagged code module are themselves tagged when they are stored as test datasets. In this way, test datasets are automatically tagged based on the code modules that are relevant to that dataset, i.e., datasets that triggered an output from the code module. When a new code module with the same tag is tested, these datasets are more likely to match and trigger the new code module, exposing potential problems in the new code module (e.g., bugs, false positives, etc.)

As part of the testing/production environment, the testing server 150 may automatically promote untested code modules to the production system, i.e., to be a tested code module, if the untested code module is able to process an individualized set of test datasets. Similarly, the testing server 150 may deny the promotion of the new code module if the untested code module fails to handle the individualized set of test datasets. Additionally, the testing server 150 may be used to automatically demote tested code modules that are not able to process the latest device datasets. For any code modules that are determined to be inappropriate for promotion into the production system, the testing system may provide feedback to the author(s) of the code module regarding why the code module failed the testing system.

Figure 5:
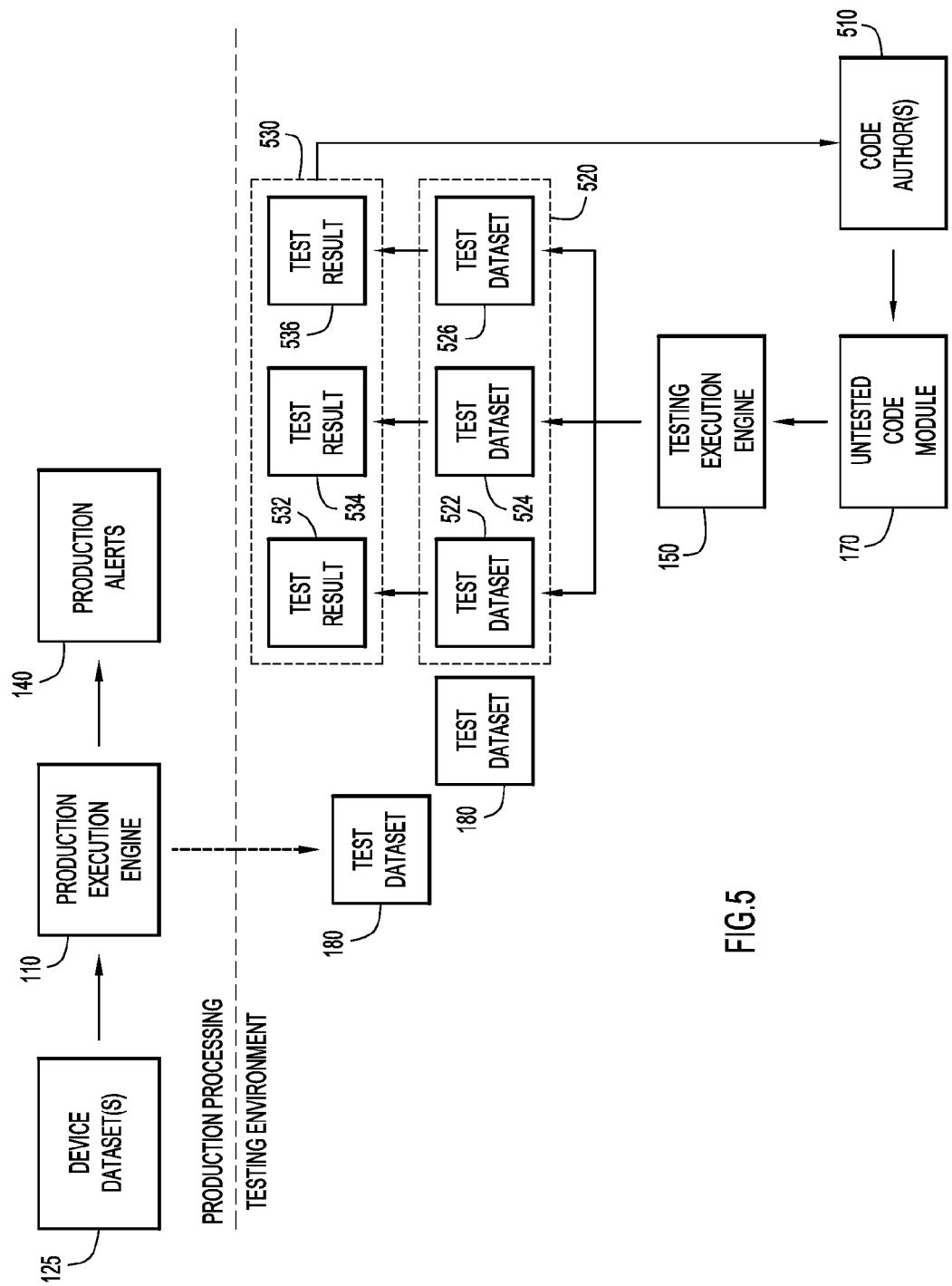
FIG. 5 is a diagram illustrating the testing system saving input datasets from the production system to provide feedback on the performance of a code module to the author of the code module, according to an example embodiment.

Referring now to FIG. 5, a block diagram shows an example of the production system and testing system providing feedback to the author of a new code module. As described with respect to FIG. 1, a plurality of device datasets 125 are processed by the production execution engine 110 using a plurality of tested code modules to generate the production alerts 140. Each combination of device dataset and code module may contribute to the production alerts. The production engine 110 sends the device datasets 125 to the testing environment where they are saved as test datasets 180 so they can be used later for testing other code modules.

A code author 510 submits a new/untested code module 170 to the testing environment to be tested against the saved test datasets 180. The code author 510 may include more than one person, as several users may collaborate on writing different portions of the untested code module 170. The testing execution engine 150, which may be cloned from the production execution engine 110, runs the untested code module 170 against a set of test datasets 520. The set of test datasets 520 includes test datasets 522, 524, and 526, which have been selected from the complete set of test datasets 180.

Running the untested code module 170 in the testing execution engine 150 with each dataset in the set of test datasets 520 generates a set of test results 530. Each of the test datasets 522, 524, and 526 causes the untested code module 170 to generate test results 532, 534, and 536, respectively. In one example, each of the test datasets 522, 524, and 526 are processed in parallel by the testing execution engine 150 with copies of the untested code module 170. The set of test results 530 includes any alerts generated by the untested code module 170 running with the test datasets 522, 524, and/or 526, and may also include performance metrics for running the untested code module 170. The set of test results 530 is sent to the code author 510, allowing them to see any false positive/negative results, true positive/negative results, and other information that allows the code author 510 to further refine the untested code module 170.

Figure 6:
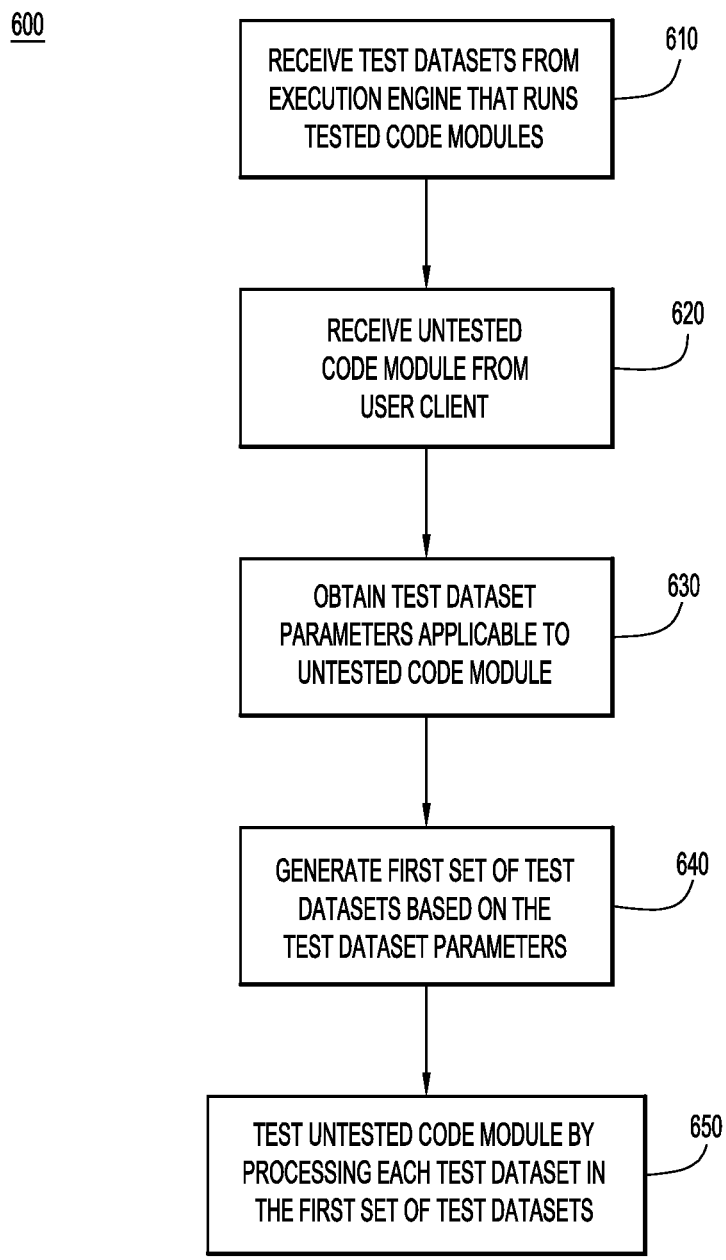
FIG. 6 is a flow chart illustrating the operations performed by a test server to generate individualized test datasets for an untested code module, according to an example embodiment.

Referring now to FIG. 6, a flowchart is shown that illustrates operations of a code module testing process 600 performed by a computing device (e.g., testing server 150). In step 610, the testing server receives a plurality of test datasets from an execution engine. The execution engine processes operational datasets with a plurality of tested code modules, and the operational datasets comprise data from at least one computing device. In one example, the test datasets comprise the operational datasets after they have been processed by the execution engine. In step 620, the testing server receives an untested code module from a user client. The testing server obtains test dataset parameters that are applicable to the untested code module in step 630. In one example, the test dataset parameters may include one or more of an indication of the number of recent test datasets to use, an indication of the number of worst-case test datasets to use, or an indication of the number of technology related test datasets to use.

Based on the test dataset parameters, the testing server generates a first set of test datasets in step 640. In one example, the first set of test datasets may include recently added test datasets, worst-case test datasets, and/or tagged test datasets. In other words, the test dataset parameters may indicate that the untested code module is to be tested against a set of test datasets including the 50 most recently added test datasets, 10 worst-case test datasets, and 30 test datasets with a specific tag (e.g., technology tag). In step 650, the testing server tests the untested code module by processing each test dataset in the first set of test datasets using the untested code module to produce test results.

Figure 7:
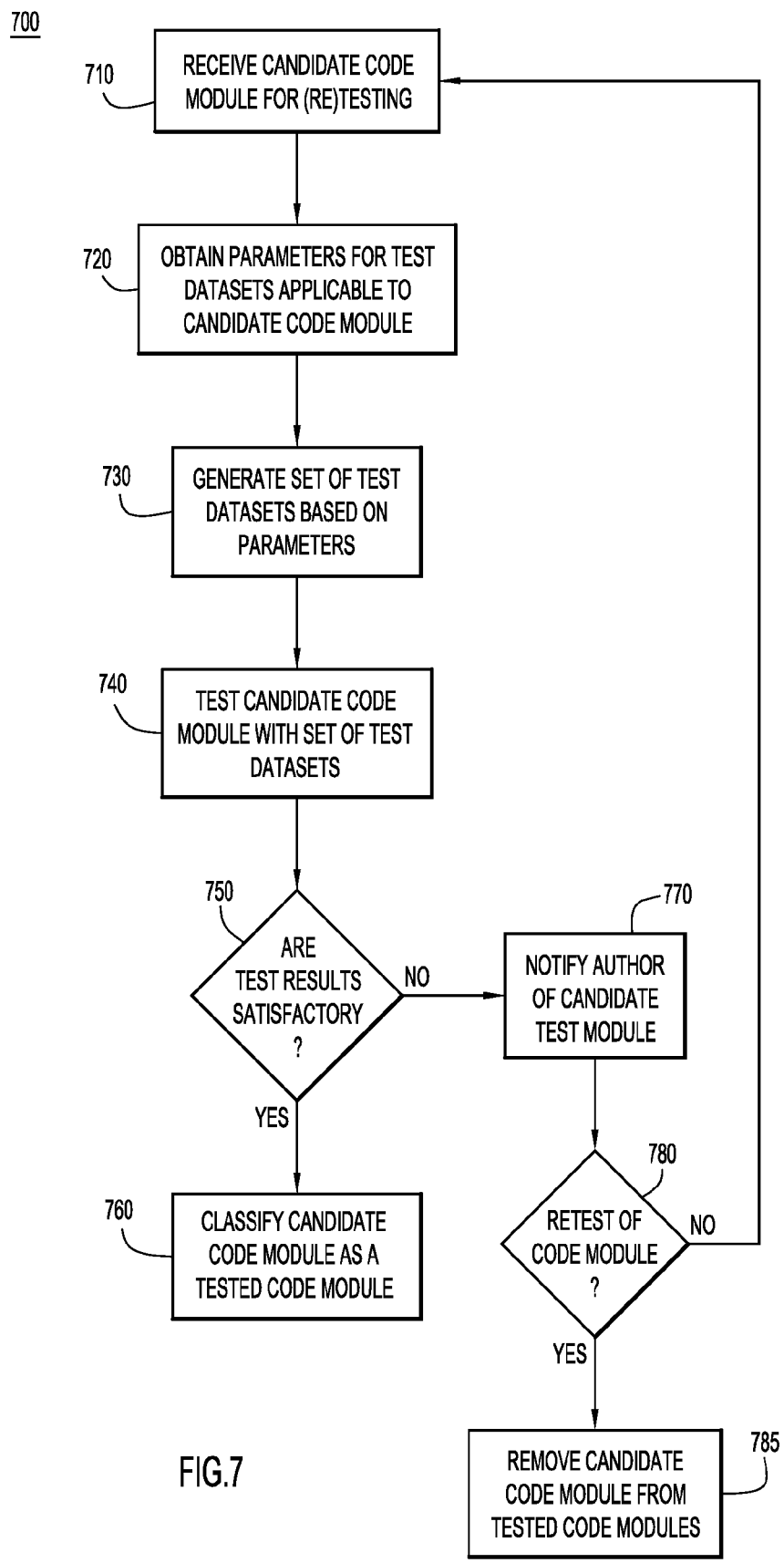
FIG. 7 is a flow chart illustrating the operations performed by a test server in automatically promoting or demoting code modules, according to an example embodiment.

Referring now to FIG. 7, a flowchart is shown that illustrates operations of an automated promotion/demotion process 700 performed by a computing device (e.g., testing server 150). In step 710, the testing server receives a candidate code module for testing. In one example, the candidate code module is a new code module that has not been previously tested. Alternatively, the candidate code module may be a previously tested code module, e.g., from the production system, that is being re-evaluated. Tested code modules may be retested as part of a periodic stress test. Alternatively, tested code modules may be continuously tested for performance while in the production system.

In step 720, the testing server obtains test dataset parameters that are applicable to the candidate code module. In one example, the test dataset parameters may include one or more of an indication of the number of recent test datasets to use, an indication of the number of worst-case test datasets to use, or an indication of the number of technology related test datasets to use. Based on the test dataset parameters, the testing server generates a first set of test datasets in step 730. In one example, the first set of test datasets may include recently added test datasets, worst-case test datasets, and/or tagged test datasets.

In step 740, the testing server tests the candidate code module by processing each test dataset in the set of test datasets, generating a test results for the candidate code module. If the test results are satisfactory, as determined in step 750, then the candidate code module is automatically classified as a tested code module ready for the production system in step 760. In one example, test results may be deemed satisfactory or unsatisfactory based on failure rate and/or runtime of the candidate code module. For instance, a candidate code module with no code exception faults that processes each test dataset within a predetermined runtime threshold for each test dataset may be determined to provide satisfactory test results.

If the test results are not satisfactory, as determined in step 750, then the code author of the candidate code module is notified in step 770. The test results may be sent to the code author, along with the reason that the candidate code module failed to provide satisfactory test results, e.g., the candidate code module crashed on these specific test datasets, the candidate code module ran for too long to process some of the test datasets. If the candidate code module is a previously tested code module that is being retested, as determined in step 780, then the candidate code module is automatically demoted and removed from the tested code modules in step 785. If the candidate code module was a new code module, i.e., it was not being retested, as determined in step 780, then the testing server waits for the next candidate code module to be received. The code author may resubmit a failed code module after refining the code based on the test results of the previous test, and the testing server will begin the process 700 again.

Figure 8:
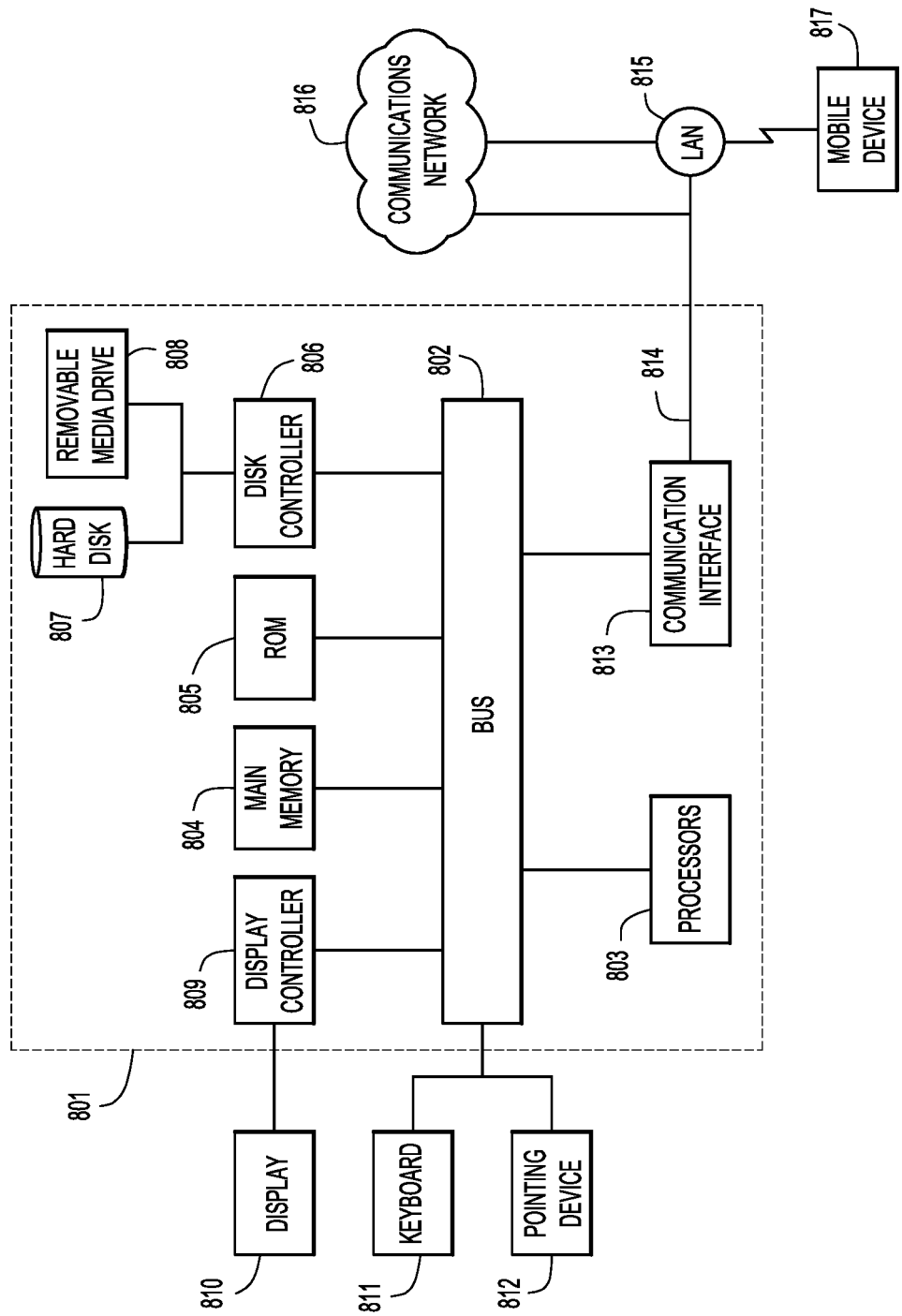
FIG. 8 is a simplified block diagram of a device that that may be configured to perform methods presented herein, according to an example embodiment.

Referring now to FIG. 8, an example of a computer system 801 (e.g., production execution engine 110, testing server 150, etc.) upon which the embodiments presented may be implemented is shown. The computer system 801 may be programmed to implement a computer based device, such as an IC rule testing system. The computer system 801 includes a bus 802 or other communication mechanism for communicating information, and a processor 803 coupled with the bus 802 for processing the information. While the figure shows a single block 803 for a processor, it should be understood that the processors 803 may represent a plurality of processing cores, each of which can perform separate processing. The computer system 801 also includes a main memory 804, such as a random access memory (RAM) or other dynamic storage device (e.g., dynamic RAM (DRAM), static RAM (SRAM), and synchronous DRAM (SD RAM)), coupled to the bus 802 for storing information and instructions to be executed by processor 803. In addition, the main memory 804 may be used for storing temporary variables or other intermediate information during the execution of instructions by the processor 803.

The computer system 801 further includes a read only memory (ROM) 805 or other static storage device (e.g., programmable ROM (PROM), erasable PROM (EPROM), and electrically erasable PROM (EEPROM)) coupled to the bus 802 for storing static information and instructions for the processor 803.

The computer system 801 also includes a disk controller 806 coupled to the bus 802 to control one or more storage devices for storing information and instructions, such as a magnetic hard disk 807, and a removable media drive 808 (e.g., floppy disk drive, read-only compact disc drive, read/write compact disc drive, compact disc jukebox, tape drive, and removable magneto-optical drive, solid state drive, etc.). The storage devices may be added to the computer system 801 using an appropriate device interface (e.g., small computer system interface (SCSI), integrated device electronics (IDE), enhanced-IDE (E-IDE), direct memory access (DMA), ultra-DMA, or universal serial bus (USB)).

The computer system 801 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 801 may also include a display controller 809 coupled to the bus 802 to control a display 810, such as a cathode ray tube (CRT), liquid crystal display (LCD) or light emitting diode (LED) display, for displaying information to a computer user. The computer system 801 includes input devices, such as a keyboard 811 and a pointing device 812, for interacting with a computer user and providing information to the processor 803. The pointing device 812, for example, may be a mouse, a trackball, track pad, touch screen, or a pointing stick for communicating direction information and command selections to the processor 803 and for controlling cursor movement on the display 810. In addition, a printer may provide printed listings of data stored and/or generated by the computer system 801.

The computer system 801 performs a portion or all of the processing steps of the operations presented herein in response to the processor 803 executing one or more sequences of one or more instructions contained in a memory, such as the main memory 804. Such instructions may be read into the main memory 804 from another computer readable storage medium, such as a hard disk 807 or a removable media drive 808. One or more processors in a multi-processing arrangement may also be employed to execute the sequences of instructions contained in main memory 804. In alternative embodiments, hard-wired circuitry may be used in place of or in combination with software instructions. Thus, embodiments are not limited to any specific combination of hardware circuitry and software.

As stated above, the computer system 801 includes at least one computer readable storage medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM, DVD), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 801, for driving a device or devices for implementing the operations presented herein, and for enabling the computer system 801 to interact with a human user (e.g., a software developer). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 801 also includes a communication interface 813 coupled to the bus 802. The communication interface 813 provides a two-way data communication coupling to a network link 814 that is connected to, for example, a local area network (LAN) 815, or to another communications network 816 such as the Internet. For example, the communication interface 813 may be a wired or wireless network interface card to attach to any packet switched (wired or wireless) LAN. As another example, the communication interface 813 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 813 sends and receives electrical, electromagnetic or optical signals that carry digital data streams representing various types of information.

The network link 814 typically provides data communication through one or more networks to other data devices. For example, the network link 814 may provide a connection to another computer through a local are network 815 (e.g., a LAN) or through equipment operated by a service provider, which provides communication services through a communications network 816. The local network 814 and the communications network 816 use, for example, electrical, electromagnetic, or optical signals that carry digital data streams, and the associated physical layer (e.g., CAT 5 cable, coaxial cable, optical fiber, etc.). The signals through the various networks and the signals on the network link 814 and through the communication interface 813, which carry the digital data to and from the computer system 801 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 801 can transmit and receive data, including program code, through the network(s) 815 and 816, the network link 814 and the communication interface 813. Moreover, the network link 814 may provide a connection through a LAN 815 to a mobile device 817 such as a personal digital assistant (PDA), tablet computer, laptop computer, or cellular telephone.

In summary, an IC rule testing system leverages the plurality of datasets processed by a production engine to test a new code module (i.e., an implementation of a new IC rule) against dozens or hundreds of relevant, real-world datasets to help identify IC rule problems, false positives, and false negatives. The new code module may also be tested against specific test datasets that share the same technology category, as well as worst-case datasets that have proven problematic for other code modules. This further increases the ability of the testing system to catch IC rule problems before the IC rule is made "live" (i.e., before the code module enters the production system). This automatic testing system dramatically improves the quality of the code modules created by inexperienced codes, and helps protect the production system from poorly written code modules.

Using the testing system described herein allows for rapid creation of IC rules that starts with a greater level of efficacy than would be created without the testing system. Immediately testing new IC rules against a multitude of real-world datasets reduces the time required for tweaking and adjusting the code module based on unforeseen dataset configurations. The testing system allows for logical errors and problems to be seen and addressed prior to integration of an IC rule into a production workflow where the generation of invalid or incorrect alerts may have negative consequences. The end-to-end automation allows the testing system to collect and identify test datasets that are always up to date and reflect the real-world environment into which an IC rule will be expected to operate.

In one form, a method is provided for a testing server to test new code modules using individualized sets of test data. The testing server receives a plurality of test datasets from an execution engine. The execution engine runs a plurality of tested code modules to process operational datasets of at least one computing device. The testing server receives an untested code module from a user client, and obtains test dataset parameters applicable to the untested code module. The server generates a first set of test datasets from the plurality of test datasets based on the test dataset parameters. The server tests the untested code module by processing each test dataset in the first set of test datasets to produce test results.

In another form, an apparatus is provided comprising a network interface, a memory, and a processor. The network interface is configured to communicate with an execution engine that runs a plurality of tested code modules to process operational datasets of at least one computing device. The processor is coupled to the network interface unit and the memory, and is configured receive a plurality of test datasets from the execution engine via the network interface unit. The processor is also configured to receive an untested code module from a user client, and obtain test dataset parameters applicable to the untested code module. The processor is further configured to generate a first set of test datasets from the plurality of test datasets based on the test datasets parameters. The processor is configured to test the untested code module by processing each test dataset in the first set of test datasets to produce test results.

In a further form, an apparatus comprising a network interface and a processor is configured to perform any of the methods described and shown herein.

In still another form, a non-transitory computer readable storage media is provided that is encoded with instructions that, when executed by a processor, cause the processor to perform any of the methods described and shown herein.

The above description is intended by way of example only. The present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Although the techniques are illustrated and described herein as embodied in one or more specific examples, it is nevertheless not intended to be limited to the details shown, since various modifications and structural changes may be made within the scope and range of equivalents of this disclosure.

What is claimed is:

1. A computer-implemented method comprising:
    monitoring and receiving a plurality of test datasets from an execution engine, the plurality of test datasets being device datasets of a plurality of computing devices that the execution engine processed by utilizing the device datasets as input data for a plurality of tested and validated code modules comprising of one or more technologies, wherein the monitoring further classifies each of the received plurality of test datasets as one of recently received test datasets, worst-case test datasets, or tagged datasets, the tagged datasets include first tags that indicate the one or more technologies of the tested and validated code modules;
    receiving an untested code module from a user client, wherein the untested code module includes a second tag that identifies one or more technologies of the untested code module;
    obtaining test datasets parameters for-the untested code module, wherein the test dataset parameters include at least one of a first number of tagged datasets, a second number of most recently received test datasets, and a third number of worst-case test datasets to be selected from the plurality of test datasets for the untested code module;
    generating a first set of test datasets applicable to the untested code module from the plurality of test datasets based on the test dataset parameters by selecting the first number of tagged datasets that match the second tag of the untested code module, the second number of most recently received test datasets, and the third number of worst-case test datasets from the classified plurality of test datasets as indicated in the test dataset parameters;

testing the untested code module by processing each test dataset in the first set of test datasets to produce test results.

2. The method of claim 1, further comprising notifying an author of the untested code module with the test results.

3. The method of claim 1, further comprising determining whether each particular test dataset of the plurality of test datasets is a worst-case test dataset based on results of the particular test dataset being processed by the plurality of tested code modules on the execution engine.

4. The method of claim 1, further comprising:
re-testing a previously tested code module of the plurality of tested and validated code modules as the untested code module; and
based on unsatisfactory results of the re-testing, removing the previously tested code module from the plurality of tested and validated code modules.

5. The method of claim 4, wherein each of the tested code modules is periodically re-tested as the untested code module.

6. The method of claim 1, wherein the one or more tags include a Virtual Private Network (VPN) tag, a Network Address Translation (NAT) tag, a Session Initiation Protocol (SIP) tag, a routing tag, or a security tag.

7. An apparatus comprising:
a network interface unit configured to communicate with an execution engine that processes a plurality of device datasets of a plurality of computing devices by utilizing the device datasets as input data for a plurality of tested and validated code modules comprising one or more technologies;
a memory; and
a processor coupled to the network interface unit and memory, the processor configured to:
monitor and receive a plurality of test datasets from the execution engine via the network interface unit, the plurality of test datasets being the device datasets of the plurality of computing devices, wherein monitoring further classifies each of the received plurality of test datasets as one of recently received test datasets, worst-case test datasets, or tagged datasets, the tagged datasets include first tags that indicate the one or more technologies of the tested and validated code modules;
receive an untested code module from a user client, wherein the untested code module includes a second tag that identifies one or more technologies of the untested code modules;
obtain test dataset parameters for the untested code module, wherein the test dataset parameters include at least one of a first number of tagged datasets, a second number of most recently received test datasets, and a third number of worst-case test datasets to be selected from the plurality of test datasets for the untested code module;
generate a first set of test datasets applicable to the untested code module from the plurality of test datasets based on the test dataset parameters by selecting the first number of tagged datasets that match the second tag of the untested code module, the second number of most recently received test datasets, and the third number of worst-case test datasets from the classified plurality of test datasets as indicated in the test dataset parameters; and
test the untested code module by processing each test dataset in the first set of test datasets to produce test results.

8. The apparatus of claim 7, wherein the processor is further configured to notify an author of the untested code module with the test results.

9. The apparatus of claim 7, wherein the processor is further configured to determine whether each particular test dataset of the plurality of test datasets is a worst-case test dataset based on results of the particular test dataset being processed by the plurality of tested code modules on the execution engine.

10. The apparatus of claim 7, wherein the one or more tags include a Virtual Private Network (VPN) tag, a Network Address Translation (NAT) tag, a Session Initiation Protocol (SIP) tag, a routing tag, or a security tag.

11. The apparatus of claim 7, wherein the processor is further configured to:
re-test a previously tested code module of the plurality of tested and validated code modules as the untested code module; and
based on unsatisfactory results of the re-testing, remove the previously tested code module from the plurality of tested and validated code modules.

12. The apparatus of claim 11, wherein the processor is further configured to periodically re-test each of the tested code modules as the untested code module.

13. One or more non-transitory computer readable storage media encoded with computer executable instructions operable to cause a processor to:
monitor and receive a plurality of test datasets from an execution engine, the plurality of datasets being device datasets of a plurality of computing devices that the execution engine processed by utilizing the device datasets as input data for a plurality of tested and validated code modules comprising of one or more technologies, wherein the monitoring further classifies each of the received plurality of test datasets as one of recently received test datasets, worst-cast test datasets, or tagged datasets, the tagged datasets include first tags that indicate the one or more technologies of the tested and validated code modules;
receive an untested code module from a user client, wherein the untested code module includes a second tag that identifies one or more technologies of the untested code module;
obtain test dataset parameters for the untested code module, wherein the test dataset parameters includes at least one of a first number of tagged dataset, a second number of most recently received test datasets, and a third number of worst-case test datasets to be selected from the plurality of test datasets for the untested code module;
generate a first set of test datasets applicable to the untested code module from the plurality of test datasets based on the test dataset parameters by selecting the first number of tagged datasets that match the tag of the untested code module, the second number of most recently received test datasets, and the third number of worst-case test datasets from the classified plurality of test datasets as indicated in the test dataset parameters; and
test the untested code module by processing each test dataset in the first set of test datasets to produce test results.

14. The computer readable storage media of claim 13, further comprising instructions operable to cause the processor to notify an author of the untested code module with the test results.

15. The computer readable storage media of claim 13, further comprising instructions operable to cause the processor to determine whether each particular test dataset of the plurality of test datasets is a worst-case test dataset based on results of the particular test dataset being processed by the plurality of tested code modules on the execution engine.

16. The computer readable storage media of claim 13, wherein the one or more tags include a Virtual Private Network (VPN) tag, a Network Address Translation (NAT) tag, a Session Initiation Protocol (SIP) tag, a routing tag, or a security tag.

17. The computer readable storage media of claim 13, further comprising instructions operable to cause the processor to:
  periodically re-test a previously tested code module of the plurality of tested and validated code modules as the untested code module; and
  based on unsatisfactory results of the re-testing, removing the previously tested code module from the plurality of tested code modules.

\* \* \* \* \*

UNITED STATES PATENT AND TRADEMARK OFFICE
CERTIFICATE OF CORRECTION

PATENT NO. : 10,127,144 B2
APPLICATION NO. : 15/332080
DATED : November 13, 2018
INVENTOR(S) : Jay K. Johnston et al.

Page 1 of 1

It is certified that error appears in the above-identified patent and that said Letters Patent is hereby corrected as shown below:

In the Claims

Claim 1, Column 14, Line 52, please replace "datasets" with --dataset--
Claim 1, Column 14, Line 52, please replace "for-the" with --for the--
Claim 1, Column 14, Line 67, after "parameters;" insert --and--

Claim 13, Column 16, Line 37, please replace "worst-cast" with --worst-case--
Claim 13, Column 16, Line 47, please replace "dataset" with --datasets--

Signed and Sealed this
Eighth Day of January, 2019

Andrei Iancu
*Director of the United States Patent and Trademark Office*